United States Patent
Tanizawa et al.

(10) Patent No.: US 10,901,242 B2
(45) Date of Patent: Jan. 26, 2021

(54) DRIVING DEVICE AND DRIVING METHOD FOR PHASE CONTROLLER, AND OPTICAL SWITCH

(71) Applicant: National Institute of Advanced Industrial Science and Technology, Tokyo (JP)

(72) Inventors: Ken Tanizawa, Tsukuba (JP); Hiroyuki Matsuura, Tsukuba (JP); Satoshi Suda, Tsukuba (JP); Haruhiko Kuwatsuka, Tsukuba (JP); Keijiro Suzuki, Tsukuba (JP); Guangwei Cong, Tsukuba (JP); Kazuhiro Ikeda, Tsukuba (JP); Hitoshi Kawashima, Tsukuba (JP); Shu Namiki, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 379 days.

(21) Appl. No.: 16/063,980

(22) PCT Filed: Nov. 9, 2016

(86) PCT No.: PCT/JP2016/083221
§ 371 (c)(1),
(2) Date: Jun. 19, 2018

(87) PCT Pub. No.: WO2017/110282
PCT Pub. Date: Jun. 29, 2017

(65) Prior Publication Data
US 2020/0271962 A1     Aug. 27, 2020

(30) Foreign Application Priority Data
Dec. 21, 2015     (JP) .................................. 2015-248763

(51) Int. Cl.
*G02F 1/01*         (2006.01)
*G02B 26/00*    (2006.01)
(Continued)

(52) U.S. Cl.
CPC ............ *G02F 1/0147* (2013.01); *G02F 1/011* (2013.01); *G02F 1/0121* (2013.01); *G02F 1/313* (2013.01)

(58) Field of Classification Search
CPC ........ H04B 10/07953; H04B 10/07955; H04Q 11/0005; G02F 1/3132; G02F 1/0147;
(Continued)

(56) References Cited

U.S. PATENT DOCUMENTS

| 6,351,578 B1 | 2/2002 | Brinkman et al. |
| 7,171,064 B2 | 1/2007 | Brinkman et al. |

(Continued)

FOREIGN PATENT DOCUMENTS

| JP | 2003527624 A | 9/2003 |
| JP | 2010224189 A | 10/2010 |

OTHER PUBLICATIONS

G. W. Cong et al., *Digital Driving of Silicon-Wire-Waveguide Based Thermo-Optic Mach-Zehnder 2×2 Switches by Pulse Width Modulation Method*, The 74th Japan Society of Applied Physics Autumn Meeting, Sep. 20, 2013, pp. 1.
(Continued)

*Primary Examiner* — Dawayne Pinkney
(74) *Attorney, Agent, or Firm* — Workman Nydegger

(57) ABSTRACT

Provided is a driving device for PWM control of voltage pulses for controlling the temperature of a heater in a phase controller, the driving device being capable of increasing the response speed of an optical element such as an optical switch. Phase controllers include first and second heaters for changing the temperatures of first and second optical wave-
(Continued)

guides extending in parallel. Driving devices include pulse generation circuits that generate voltage pulses to apply to the first and second heaters. To start raising the temperature of the second heater, the pulse generation circuit generates a first voltage pulse and consecutive second voltage pulses to apply to the second heater with zero voltage pulse being applied to the first heater, the first voltage pulse having a long pulse width and the second voltage pulses following the first voltage pulse and having a shorter pulse width than the first voltage pulse.

3 Claims, 16 Drawing Sheets

(51) Int. Cl.
  *G02F 1/035* (2006.01)
  *G02F 1/313* (2006.01)
(58) Field of Classification Search
  CPC ........ G02F 2203/50; G02F 1/29; G02F 1/025; G02F 1/2255; G02F 1/225; G02B 26/001; G02B 6/122; B82Y 20/00
  USPC ....... 359/288, 237, 240, 279, 315, 245, 238; 385/16, 1–3, 40, 129–132; 398/26, 34
  See application file for complete search history.

(56) References Cited

U.S. PATENT DOCUMENTS

| | | |
|---|---|---|
| 2005/0146712 A1 | 7/2005 | Kopelovitz et al. |
| 2006/0088239 A1* | 4/2006 | Aalto .................... G02F 1/3133 385/1 |
| 2006/0186835 A1* | 8/2006 | Schwenke ................ H05B 3/84 315/344 |

OTHER PUBLICATIONS

G. W. Cong et al., *Power-Efficient Gray-Scale Control of Silicon Thermo-Optic Phase Shifters by Pulse Width Modulation Using Monolithically Integrated MOSFET,* OFC 2015, Mar. 2015, pp. 3.
International Search Report dated Feb. 7, 2017, issued in PCT Application No. PCT/JP2016/083221.
International Preliminary Report on Patentability dated Jun. 26, 2018, issued in PCT Application No. PCT/JP2016/083221.

* cited by examiner

DRIVING DEVICE AND DRIVING METHOD FOR PHASE CONTROLLER, AND OPTICAL SWITCH

TECHNICAL FIELD

The present invention relates to a driving device and a driving method for a phase controller and to an optical switch, and relates more particularly to control of pulse-width modulation (PWM) of voltage pulses for controlling the temperature of a heater in a phase controller that changes the phase of light propagating through an optical waveguide using the thermo-optic effect.

BACKGROUND ART

There is conventionally an optical switch used in a node of an optical network to switch an optical path. This optical switch can be configured using, for example, a Mach-Zehnder interferometer (MZI) element. In the MZI element, a heater provided for example near an optical waveguide is used as a phase controller. Power supply to the heater heats the heater and thus changes the temperature of the optical waveguide, producing the thermo-optic effect to change the index of refraction of the optical waveguide and change the optical difference in optical path length (phase).

Power supply to the heater can be achieved by application of DC voltage to the heater, and methods in this regard include pulse-width modulation (PWM) for changing power desirably, or more specifically, application of desired power by control of the duty cycle of voltage pulses with two values: Low and High. For example, Patent Literature 1 or Non Patent Literature 1 discloses PWM control of a heater in a thermo-optic phase controller. In PWM control, if the pulse repetition frequency is negligibly high compared to the heater's response, ON and OFF of the pulses do not affect the temperature change, and the average power and the temperature can be controlled based on the duty cycle of the pulses.

To change temperature by controlling power using PWM control, in a plain architecture illustrated in FIGS. 1 and 2, once optical path switching is started, the pulse width is changed to raise or lower the temperature of the heater, gradually raising (T1→T2) or lowering (T2→T1) the temperature of the optical wave guide. Since it takes time t for the temperature to change, the speed of switching of the optical switch (optical response) may be slowed down. In relation to such a problem, there are demands that the heater change the temperature of the optical waveguide faster to speed up optical path switching (optical response).

CITATION LIST

Patent Literature

PTL 1: Japanese Patent Laid-Open No. 2010-224189

Non Patent Literature

NPL 1: G. W. Cong, et al. "Digital driving of silicon-wire-waveguide based thermo-optic Mach-Zehnder 2×2 switches by pulse width modulation method", The 74th Japan Society of Applied Physics Autumn Meeting, Meeting Proceedings (at Doshisha University in the fall of 2013) 20p-A8-8, Sep. 20, 2013

SUMMARY OF INVENTION

Technical Problem

The present invention aims to provide a driving device and a driving method for PWM control of voltage pulses for controlling the temperature of a heater in a phase controller, the device and method capable of speeding up the response of an optical element such as an optical switch (optical path switching).

Solution to Problem

An aspect of the present invention provides a driving device for a phase controller that controls a temperature of an optical waveguide using a heater to control a phase of light propagating through the optical waveguide. The phase controller includes first and second heaters that change temperatures of first and second optical waveguides extending in parallel, respectively. The driving device includes a pulse generation circuit that generates voltage pulses to apply to the first and second heaters. To start raising a temperature of the second heater, the pulse generation circuit generates a first voltage pulse and a plurality of consecutive second voltage pulses to apply to the second heater with zero voltage pulse being applied to the first heater, the first voltage pulse having a long pulse width and the second voltage pulses following the first voltage pulse and having a shorter pulse width than the first voltage pulse.

Since the driving device for a phase controller according to the present invention starts raising the temperature of the second heater by applying the first voltage pulse with a long pulse width first, the temperature of the second heater can be raised in a short time, and also, the temperature thus reached by the temperature rise can be stably maintained by the application of the subsequent consecutive second voltage pulses with a short pulse width.

An aspect of the present invention provides an optical switch. The optical switch comprises: two input ports; two output ports; two first and second optical couplers arranged in series between the input ports and the output ports; two first and second optical waveguides extending in parallel while connecting the two optical couplers to each other; a first phase controller that is provided on the first optical waveguide between the first optical coupler and the second optical coupler and controls a temperature of the first optical waveguide using a first heater to control a phase of light propagating therethrough; a second phase controller that is provided on the second optical waveguide between the first optical coupler and the second optical coupler and controls a temperature of the second optical waveguide using a second heater to control a phase of light propagating therethrough; and a pulse generation circuit that generates voltage pulses to apply to the first and second heaters. To start raising a temperature of the second heater to make a switch from a cross state to a bar state in the optical switch, the pulse generation circuit generates a first voltage pulse and a plurality of consecutive second voltage pulses to apply to the second heater with zero voltage pulse being applied to the first heater, the first voltage pulse having a long pulse width and the second voltage pulses following the first voltage pulse and having a shorter pulse width than the first voltage pulse.

Since the optical switch according to an aspect of the present invention starts raising the temperature of the second heater by applying the first voltage pulse with a long pulse width first, the temperature of the second heater can be raised in a short time, and also, the temperature thus reached by the temperature rise can be stably maintained by the application of the subsequent consecutive second voltage pulses with a short pulse width. As a result, the optical switch can make a speedy switch from the cross state to the bar state.

An aspect of the present invention provides a driving method for a phase controller that controls a temperature of an optical waveguide using a heater to control a phase of light propagating through the optical waveguide. The phase controller includes first and second heaters that change temperatures of first and second optical waveguides extending in parallel, respectively. The driving method comprises the steps of: with zero voltage pulse being applied to the first heater, applying a first voltage pulse with a long pulse width to the second heater to start raising a temperature of the second heater; and applying, to the second heater, a plurality of consecutive second voltage pulses following the first voltage pulse and having a shorter pulse width than the first voltage pulse.

Since the driving method for a phase controller according to an aspect of the present invention starts raising the temperature of the second heater by applying the first voltage pulse with a long pulse width first, the temperature of the second heater can be raised in a short time, and also, the temperature thus reached by the temperature rise can be stably maintained by the application of the subsequent consecutive second voltage pulses with a short pulse width.

DESCRIPTION OF EMBODIMENTS

Figure 1:
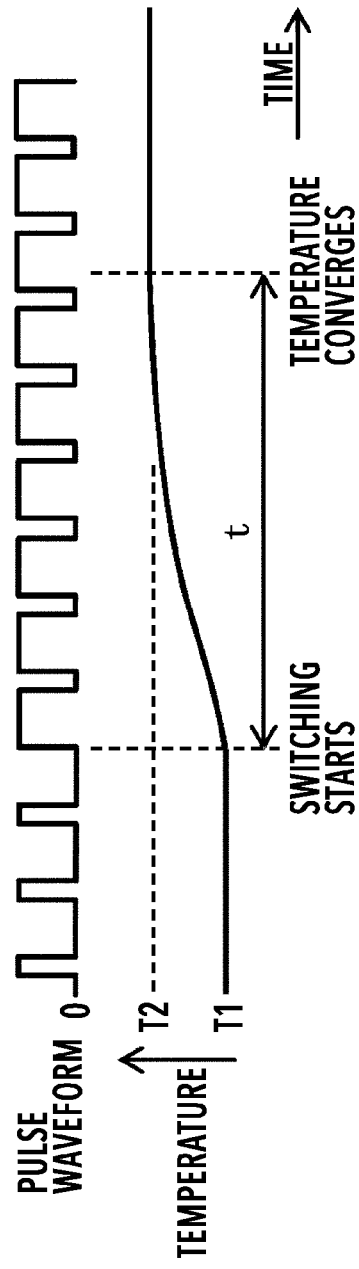
FIG. 1 is a diagram illustrating an example of conventional PWM control of voltage pulses for raising the temperature of a heater in a phase controller.
Figure 2:
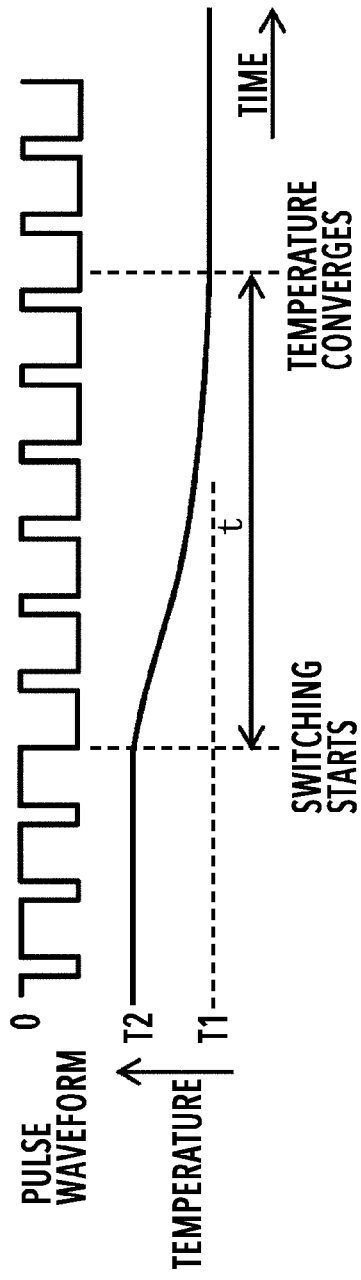
FIG. 2 is a diagram illustrating an example of conventional PWM control of voltage pulses for lowering the temperature of a heater in a phase controller.
Figure 3:
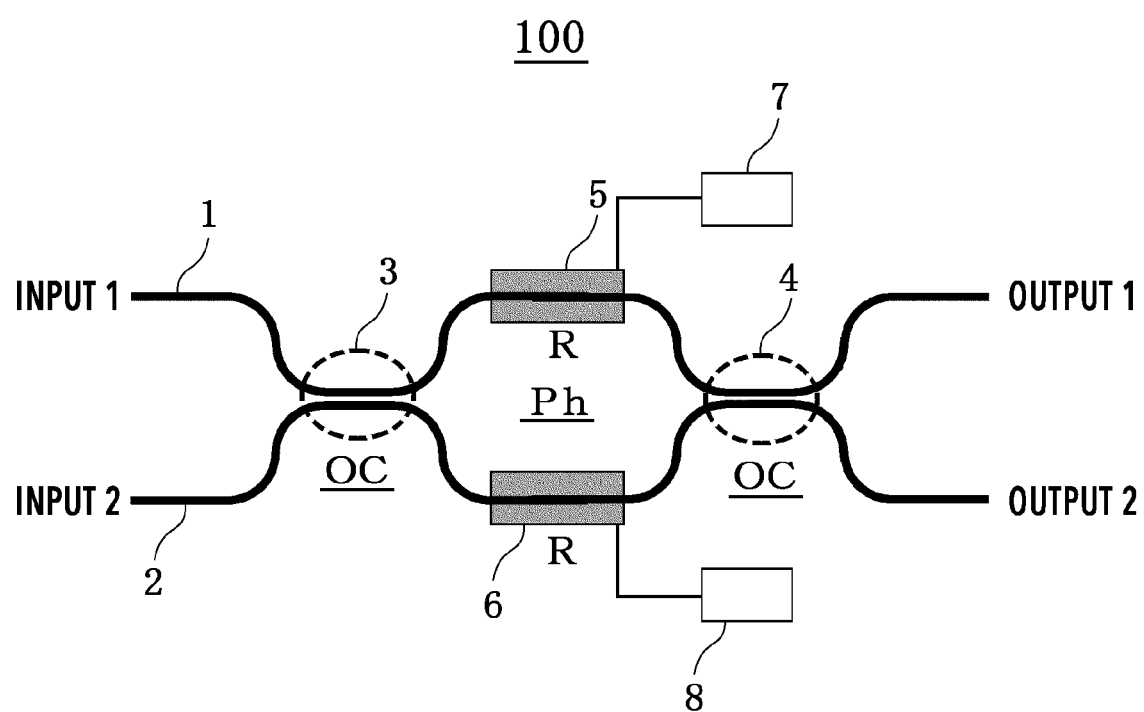
FIG. 3 is a diagram illustrating the configuration of an optical switch according to an embodiment of the present invention.

Embodiments of the present invention are described with reference to the drawings. Although the following description uses an optical switch as an example of an optical element, the present invention is not limited to an optical switch and is applicable to other types of optical elements such as an optical filter as well. FIG. 3 is a diagram illustrating the configuration of an optical switch according to an embodiment of the present invention. An optical switch 100 in FIG. 3 is an example of a Mach-Zehnder interferometer (MZI) optical switch. In FIG. 3, the optical switch 100 includes a first optical waveguide 1 provided between an input port 1 and an output port 1 and a second optical waveguide 2 provided between an input port 2 and an output port 2.

The optical switch 100 includes two optical couplers (OC) 3, 4 and phase controllers 5, 6 which are provided between the optical couplers 3, 4 on the respective optical waveguides (Ph) 1, 2 and include heaters (resistances R). Note that the optical switch 100 may include only one of the phase controllers 5, 6. The optical switch 100 further includes driving devices 7, 8 for the respective phase controllers 5, 6. The driving devices 7, 8 each include a pulse generation circuit that generates voltage pulses to apply to the corresponding heater. The pulse generation circuit will be detailed later. Note that the phase controllers 5, 6 may share a single driving device (the driving device 7 or 8).

Figure 4:
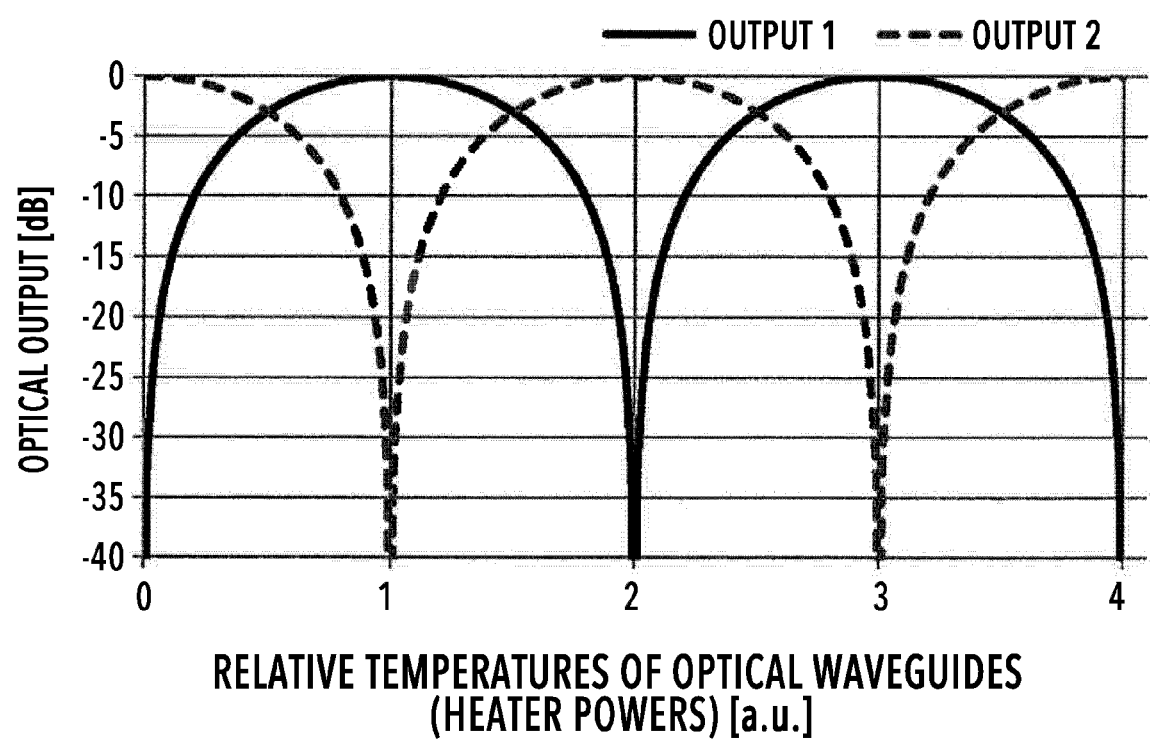
FIG. 4 is a diagram illustrating an example of optical path switch operation (optical output characteristics) of an optical switch according to an embodiment of the present invention.

FIG. 4 is a diagram illustrating an example of how the optical switch 100 in FIG. 3 performs optical path switching operation (optical output characteristics). Assume that an optical input (a signal) has just entered the input port 1 in FIG. 3. The optical switch 100 switches the optical output between the output port 1 and the output port 2 by controlling the heater powers of the phase controllers 5, 6. Specifically, in the example of FIG. 3, for example, the optical switch 100 can form a bar state by setting the heater power of the phase controller 5 to a predetermined value to cause the optical difference in the optical paths of the two optical waveguides 1, 2 to be half-wavelength (λ/2, phase difference π), so that the light may be outputted through the output port 1. Also, the optical switch 100 can form a cross state by setting the heater power of the phase controller 5 to zero to cause the optical difference in the optical paths of the two optical waveguides 1, 2 to be zero (phase difference 0), so that the light may be outputted through the output port 2.

The optical switch according to an embodiment of the present invention exemplified in FIG. 3 may be formed as part of what is called an optical circuit or an optical integrated circuit, or more specifically, can be formed to constitute a plurality of optical switches arranged in an array (e.g., n×n) on a substrate with a plurality of (e.g., n) input and output ports. In such a case, the optical couplers and the optical waveguides are both formed of a semiconductor material layer (such as Si or $SiO_2$) on the substrate (such as a Si substrate). The heater in each phase controller can be formed of a thin-film resistance disposed near the optical waveguide. These can be formed using, for example, a conventional semiconductor manufacturing process.

Figure 5:
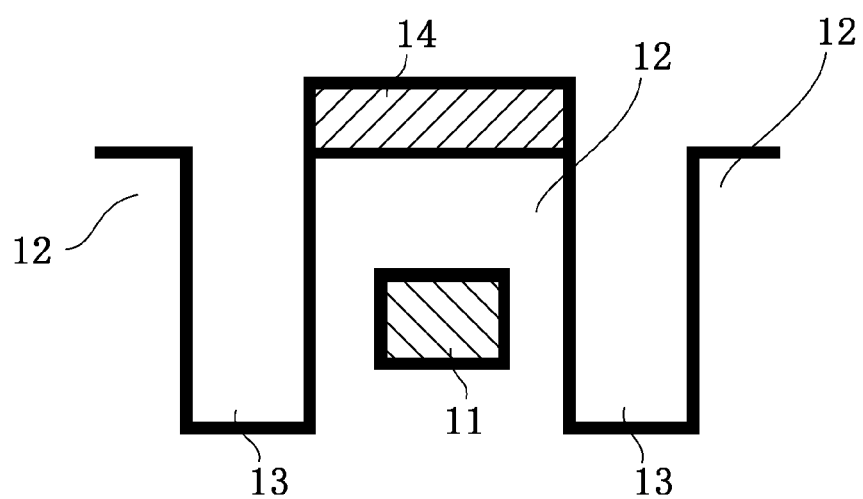
FIG. 5 is a sectional view illustrating an example position of the heater in the phase controller according to an embodiment of the present invention.

The heater formed of a thin-film resistance may be formed simply near the optical waveguide, or may be formed as follows for example. Specifically, as illustrated in the sectional view in FIG. 5, with grooves 13 being provided in a cladding layer 12 in which an optical waveguide 11, which is a core layer, is provided, a heater 14 formed of a thin-film resistance is provided on the cladding layer 12 between the grooves 13. The grooves 13 maybe either hollow or filled with a material with poor thermal conductivity. Such a configuration does not allow heat from the heater 14 to escape through the grooves, enabling a faster rise in the temperature of the optical waveguide 11.

With such a configuration, however, the temperature falls slowly even after the heater 14 stops producing heat or produces less heat, because the lateral paths for the heat to escape are shut off by the grooves 13. Thus, the mere provision of the grooves cannot achieve a speed-up of temperature control in both raising and falling the temperature. For this reason, the driving device for the phase controller of the present invention needs to perform the below-described PWM control of voltage pulses applied to the heater.

With reference to FIGS. 6 to 11, a description is given of how the driving device for the phase controller according to the present invention performs PWM control of voltage pulses applied to the heater. Voltage pulses to be PWM-controlled are all generated by a pulse generation circuit (to be described later) in the driving apparatus. First, the basic operation of PWM control is described with reference to FIGS. 6 and 7. In the example operation illustrated in FIGS. 6 and 7, only one of the phase controllers 5, 6 in FIG. 3 is used.

Figure 6:
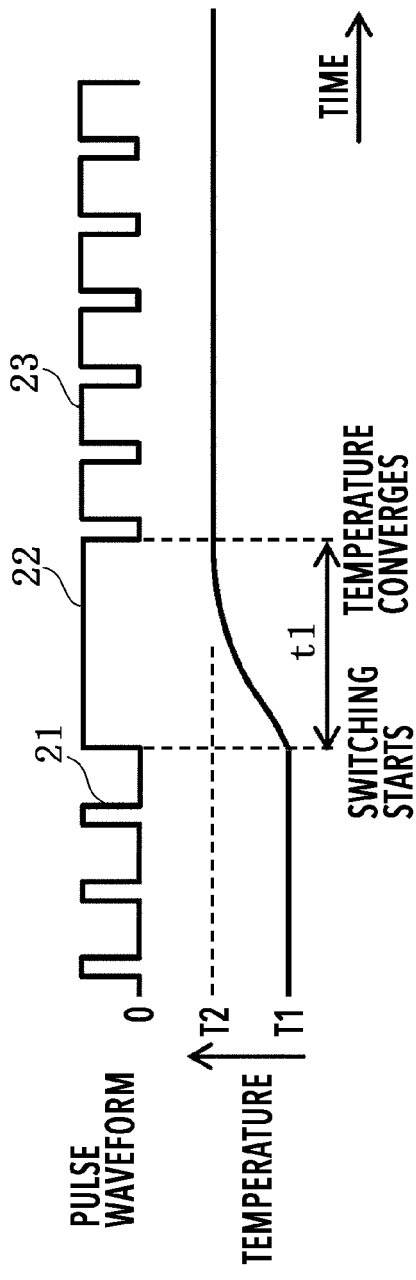
FIG. 6 is a diagram illustrating an example of PWM control of voltage pulses applied to a heater, performed by a driving device for a phase controller according to an embodiment of the present invention.

To raise the temperature of the optical waveguide in FIG. 6, at the start of optical path switching, the driving device generates a single voltage pulse 22 having a long pulse width and being on constantly for a certain period of time, in place of a plurality of consecutive voltage pulses 21 with a short pulse width. Once the temperature of the optical waveguide rises from $T1°$ C. and reaches the target temperature $T2°$ C., the driving device generates a plurality of consecutive voltage pulses 23 following the voltage pulse 22 and having a shorter pulse width than the voltage pulse 22. In the case in FIG. 6, to start raising the temperature of the optical wavelength, the driving device first applies the voltage pulse 22 having a long pulse width and being on constantly for a certain period of time. Thus, the temperature of the optical waveguide can be raised in a short time (t1). Further, the temperature T2 reached by the temperature rise can be stably maintained by the application of the subsequent voltage pulses 23 having a short pulse width. This consequently can speed up the optical path switching operation performed by the phase controller of the optical switch, i.e., the operation of switching from the cross state to the bar state. Note that a description will be given later on how to determine the pulse width t1 of the single voltage pulse 22 with a long pulse width.

Figure 7:
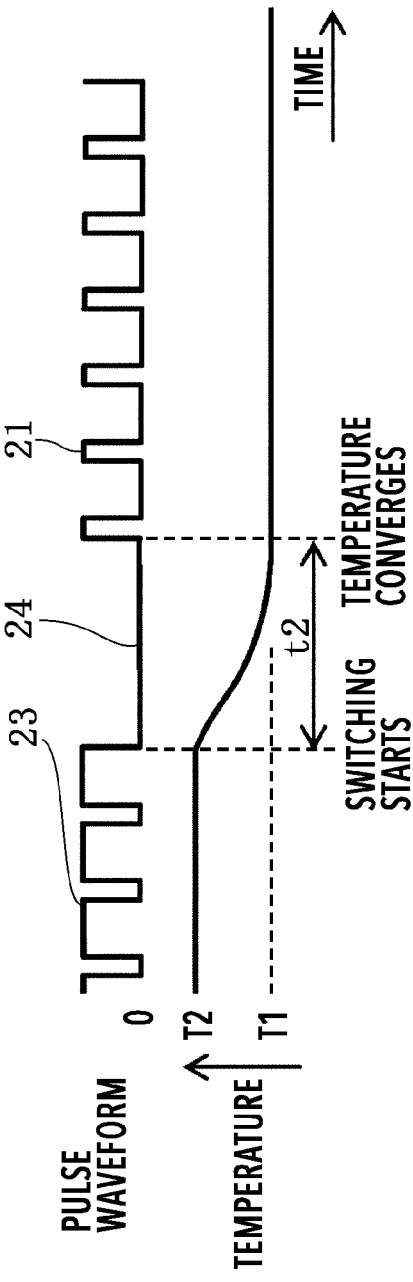
FIG. 7 is a diagram illustrating an example of PWM control of voltage pulses applied to a heater, performed by a driving device for a phase controller according to an embodiment of the present invention.

To lower the temperature of the optical waveguide in FIG. 7, at the start of optical path switching, the driving device stops the above-described consecutive voltage pulses 23 applied after the temperature rise and generates a zero-pulse state 24 being off constantly fora certain period of time. Once the temperature of the optical waveguide falls from $T2°$ C. and reaches the target $T1°$ C., the driving device generates the above-described consecutive voltage pulses 21 with a short pulse width to replace the zero-pulse state 24. In the case in FIG. 7, to start lowering the temperature of the optical wavelength, the driving device first generates the zero-pulse state 24. Thus, the temperature of the optical waveguide can be lowered in a short time (t2). Further, the temperature T1 reached by the temperature fall can be stably maintained by the application of the subsequent consecutive voltage pulses 21 having a short pulse width. This consequently can speedup the optical path switching operation performed by the phase controller of the optical switch, i.e., the operation of switching from the bar state to the cross state.

Figure 8:
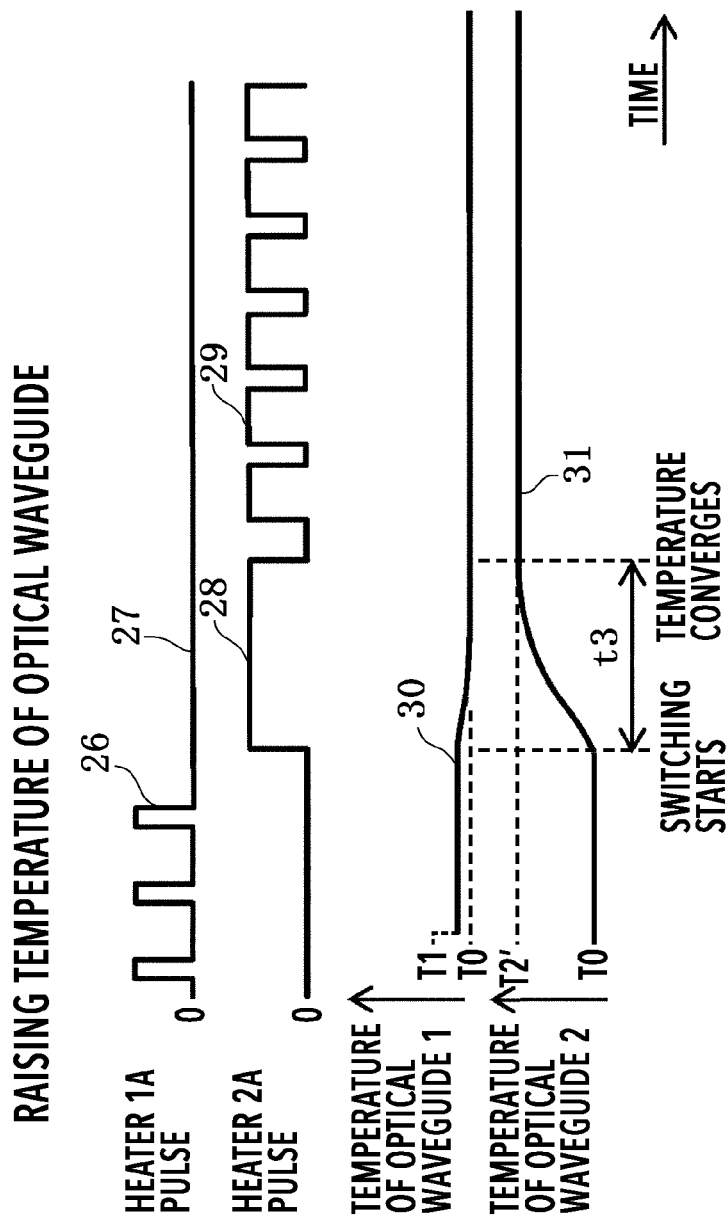
FIG. 8 is a diagram illustrating an example of PWM control of voltage pulses applied to a heater, performed by a driving device for a phase controller according to an embodiment of the present invention.

FIGS. 8 to 11 illustrate examples of operation performed using the two phase controllers 5, 6 in FIG. 3. In each of FIGS. 8 to 11, a heater 1A is the heater in the phase controller 5 in FIG. 3, and a heater 2A is the heater in the phase controller 6 in FIG. 3. FIG. 8 illustrates an example of operation for raising the temperature of the optical waveguide 2. The following operation similarly applies to an example of operation for raising the temperature of the optical waveguide 1. In FIG. 8, the driving device first stops voltage pulses 26 having a short width and being applied to the heater 1A to bring the heater 1A to a zero-pulse state 27, thereby lowering the temperature of the optical waveguide 1 from T1 to T0 (zero). When starting optical path switching, the driving device generates a single voltage pulse 28 having a long pulse width and being on constantly for a certain period of time to apply to the heater 2A. Once the temperature of the optical waveguide 2 increases from $T0°$ C. and reaches the target $T2'°$ C. (after a lapse of a time t3 since the start of switching), the driving device generates a plurality of consecutive voltage pulses 29 following the voltage pulse 28 and having a shorter pulse width than the voltage pulse 28.

In the case in FIG. 8, to start raising the temperature of the optical wavelength 2, the driving device first applies the voltage pulse 28 having a long pulse width and being on constantly for a certain period of time. Thus, the temperature of the optical waveguide can be raised in a short time. Further, the temperature T2' reached by the temperature rise can be stably maintained by the application of the subsequent consecutive voltage pulses 29 having a short pulse width. This consequently can speed up the operation of switching from the cross state to the bar state performed by the phase controller of the optical switch. Note that a description will be given later on how to determine the pulse width t3 of the single voltage pulse 28 with a long pulse width.

Figure 9:
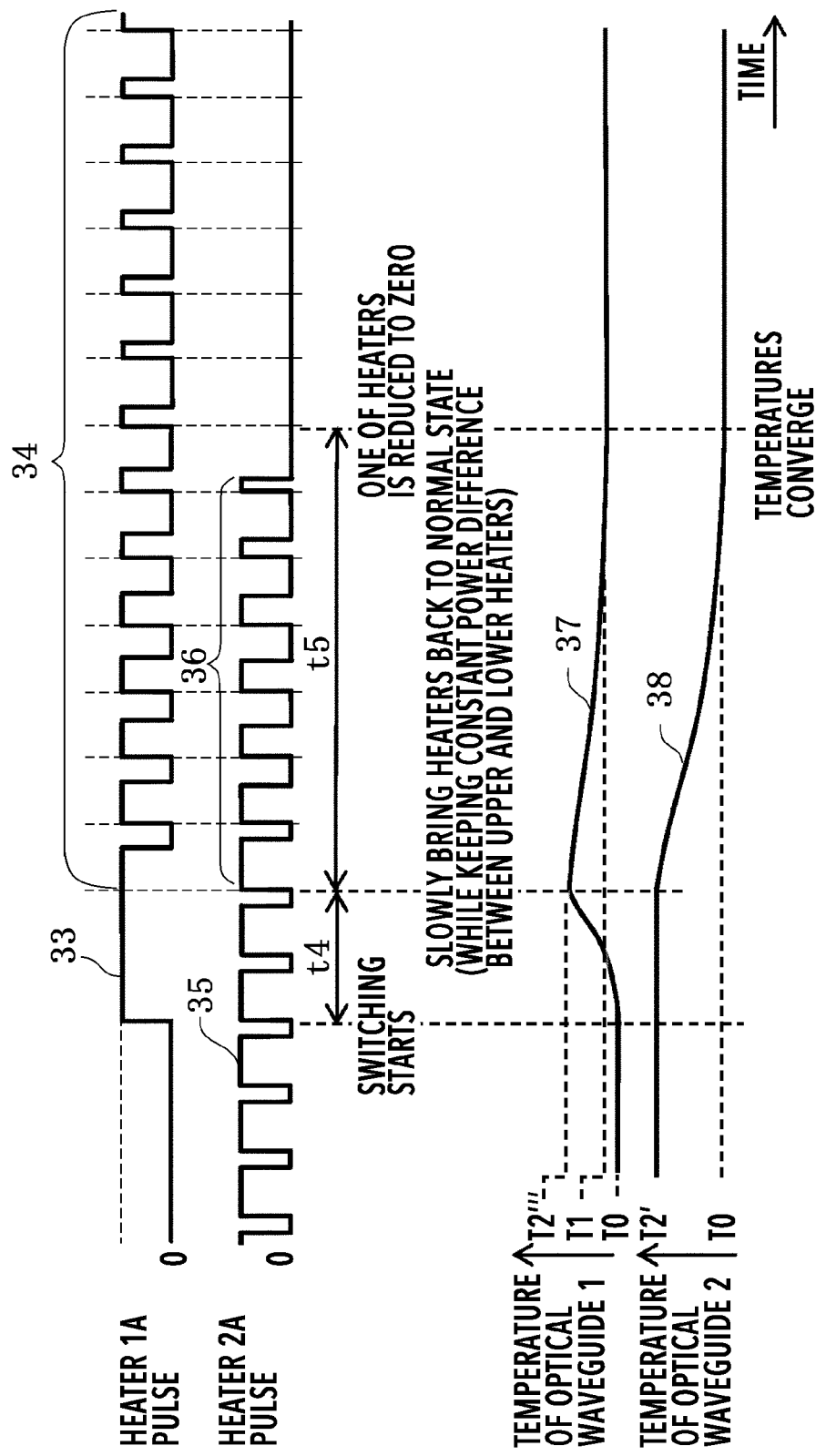
FIG. 9 is a diagram illustrating an example of PWM control of voltage pulses applied to a heater, performed by a driving device for a phase controller according to an embodiment of the present invention.

FIG. 9 illustrates an example of operation for lowering the temperature of the optical waveguide 2. The following operation similarly applies to an example of operation for lowering the temperature of the optical waveguide 1. In FIG. 9, when starting optical path switching, the driving device applies a single voltage pulse 33 having a long pulse width and being on constantly for a certain period of time to the heater 1A to raise the temperature 37 of the optical waveguide 1 rapidly so that the temperature 38 of the optical waveguide 2 and the temperature 37 of the optical waveguide 1 may be brought closer to each other (T2' and T2'''). More specifically, aiming to make the temperature of the optical waveguide 1 slightly higher than that of the optical waveguide 2 in the end, the driving device applies the constantly-on voltage pulse 33 until the temperature of the optical waveguide 1 exceeds the temperature of the optical waveguide 2 by (T1-T0)° C. Since the desired temperature has been thus reached, optical path switching is ended (the end of the period t4 in FIG. 9).

Thereafter, the driving device gradually lowers the temperatures by gradually shortening the pulse widths of the voltage pulses 34, 36 applied to the respective heaters while maintaining the temperature difference (T1-T0), and brings the heaters to the final state where the temperatures of the respective optical waveguides converge. In this event, to maintain the difference in temperature between the optical waveguide 1 and the optical waveguide 2 (T1-T0), after a lapse of the period t5 the driving device brings the voltage pulses 36 applied to the heater 2A to a zero-pulse state and applies the voltage pulses 34 with a short pulse width only to the heater 1A. In this case, the difference in temperature between the two optical waveguides has already been brought to a predetermined value at the end of the period of t4, and therefore faster optical path switching is achieved.

In FIG. 9, before the optical path switching, the heater 2A is receiving voltage pulses 35 with a long pulse width and therefore has a high temperature, while the heater 1A is receiving zero voltage pulse and therefore has a low temperature. While the final objective is to lower the temperatures of both optical waveguides, what the phase controllers 5, 6 in FIG. 3 have to do for optical path switching is to simply set the optical waveguides (Ph) 1, 2 to the same optical phase. Thus, the constantly-on voltage pulse 33 is applied to the heater 1A in the period of t4 in FIG. 9 to heat up the heater 1A rapidly. This causes the two optical waveguides (Ph) 1, 2 to equally have high temperatures and the same optical phase, being able to switch the optical path quickly. Both heaters may be left as is in this state of receiving voltage pulses that give them high temperatures. Alternatively, in FIG. 9, the driving device gradually changes the voltage pulses in the period of t5 to bring the temperatures of the heaters back to low temperatures. Although the temperatures do not necessarily have to be brought back to low temperatures, practical advantages can be expected from it, such as mitigation of aging by saving energy or by keeping the heater temperatures low. Thus, in the period of t5, the temperatures are gradually returned to low temperatures with the difference in power between the two heaters 1A, 2A controlled.

Figure 10:
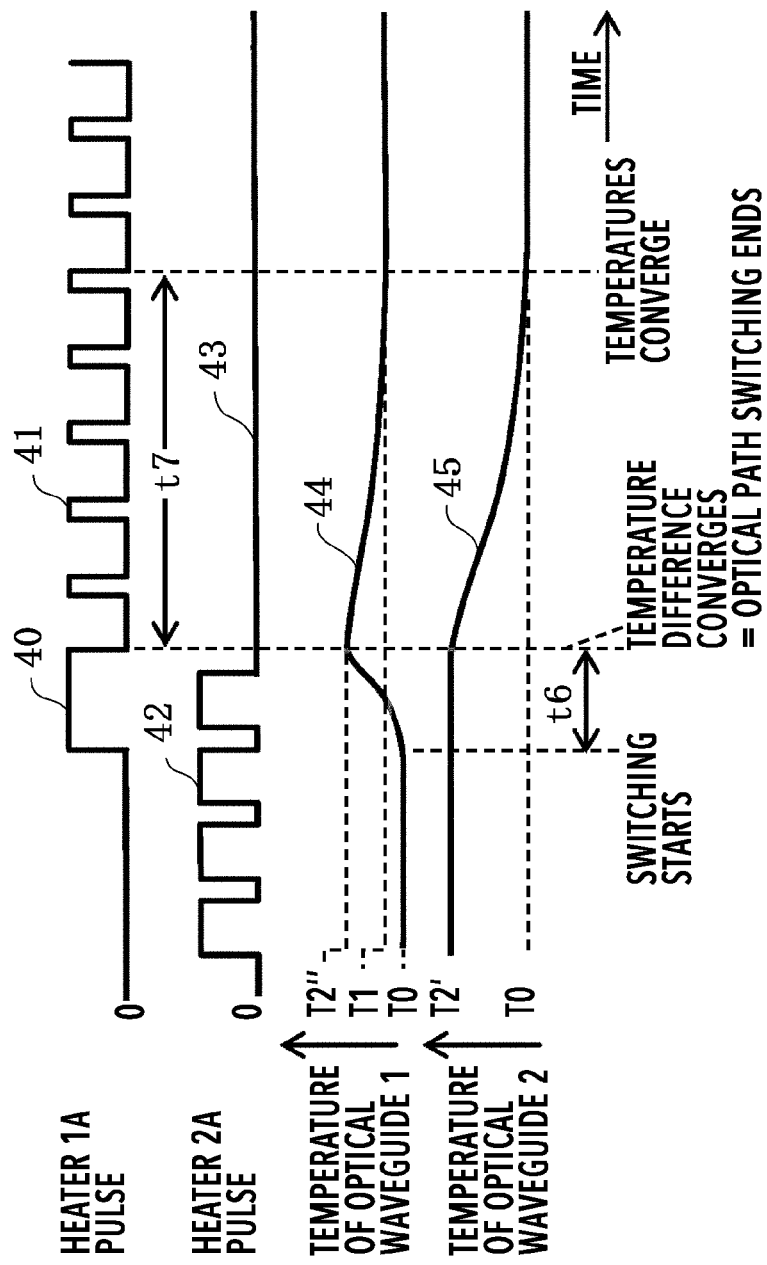
FIG. 10 is a diagram illustrating an example of PWM control of voltage pulses applied to a heater, performed by a driving device for a phase controller according to an embodiment of the present invention.

FIG. 10 illustrates, like FIG. 9, an example of operation for lowering the temperature of the heater 2A. In the example operation illustrated in FIG. 10, at the end of the period t6 from the start of optical path switching, at which the difference in temperature between the optical waveguide 1 and the optical waveguide 2 reaches a predetermined value, the heaters 1A, 2A are brought back to the final state rapidly, instead of being gradually lowered in temperature. Specifically, the driving device rapidly raises the temperature of the optical waveguide 1 by applying to the heater 1A a voltage pulse 40 having a long pulse with and being on constantly for a certain period of time, and after the temperature 45 of the optical waveguide 2 and the temperature 44 of the optical waveguide 1 are brought closer to each other (T2' and T2'' after a lapse of the time t6), the driving device switches the voltage pulse to apply to the heater 1A to consecutive voltage pulses 41 with a short pulse width. In coincidence with the switching, the driving device stops voltage pulses 42 being applied to the heater 2A and brings the heater 2A to a zero-pulse state 43.

In this case, the temperature (T2") to be reached by the optical waveguide 1 is lower than the temperature (T2''') in FIG. 9. As a result, the time t6 it takes for the difference in temperature between the two optical waveguides to reach the predetermined value can be shortened, which enables even faster optical path switching operation. In addition, the time t7 it takes for the temperatures of the two optical waveguides to converge is shorter than the time t5 in FIG. 9, and thus the overall time for the optical path switching operation can be shortened.

Figure 11:
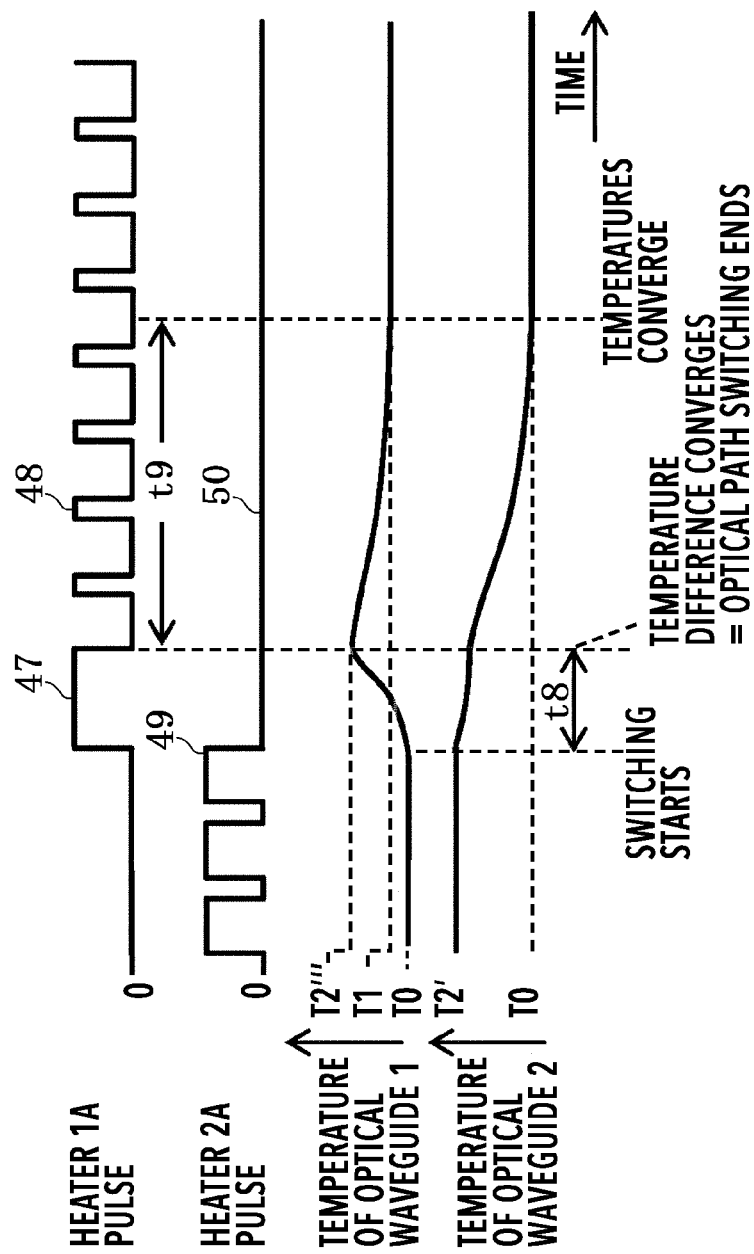
FIG. 11 is a diagram illustrating an example of PWM control of voltage pulses applied to a heater, performed by a driving device for a phase controller according to an embodiment of the present invention.

FIG. 11 is a further modification of the example operation in FIG. 10. In FIG. 11, the driving device not only brings the heaters back to the final state (temperature convergence) rapidly like in FIG. 10, but also stops the application of voltage pulses 49 to the heater 2A at the start of optical path switching, thereby making the temperature (T2''') to be reached by the optical waveguide 1 lower than the temperature (T2") in FIG. 10. As a result, the time t8 it takes for the difference in temperature between the two optical waveguides to reach the predetermined value can be shortened even more, enabling even faster optical path switch operation. In addition, the time t9 it takes for the temperatures of the two optical waveguides to converge is shorter than the time t7 in FIG. 10, and thus the overall time for the optical path switching operation can be shortened even more.

In all the examples described above, the cross state is where both of the heater 1A and the heater 2A receive zero or almost zero power, and the bar state is where only one of the heater 1A and the heater 2A receives power of a certain level. As a modification, it is also possible to configure/design the optical waveguide 1 and the optical waveguide 2 so that the phase difference between their waveguide lengths may be π, so that the bar state is where both of the heater 1A and the heater 2A receive zero or almost zero power, and the cross state is where only one of the heater 1A and the heater 2A receives power of a certain level. This configuration is disadvantageous in terms of power consumption, but may be advantageous in terms of optical characteristics. In either case, the operations described thus far are advantageous in achieving faster optical path switching operation.

Figure 12:
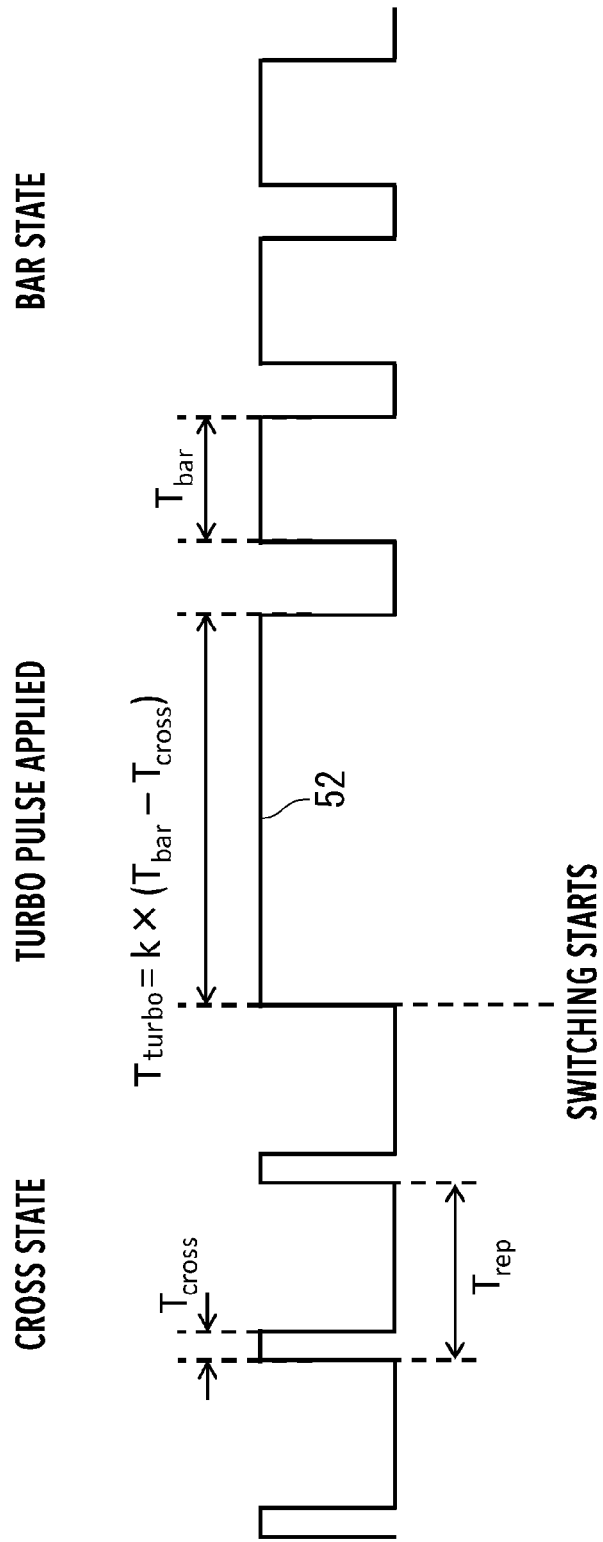
FIG. 12 is a diagram illustrating a time chart of voltage pulses applied when the optical switch according to an embodiment of the present invention switches from a cross state to a bar state.

Next, a description is given of how to determine the pulse widths t1, t3, etc. of the single voltage pulses 22, 28, etc., with long pulse widths described above. Assume that, as illustrated in FIG. 12, each period (duration) is set with the repetition period of voltage pulses being denoted as $T_{rep}$ (constant), and a long voltage pulse $T_{turbo}$ 52 being on constantly for a certain period of time is defined as in Formula (1) below:

$$T_{turbo} = k \times (T_{bar} - T_{cross}). \tag{1}$$

In other words, $T_{turbo}$ is obtained by multiplication of a constant k by the difference in pulse widths before and after the switching to the cross state or the bar state. The value k can be obtained experimentally, or may be set using the following method, for example.

The value k is a value physically determined by the material and structure of the heater as a function of PWM voltage $V_{pwm}$. If there is no need to consider breakage of the heater due to high temperature, setting k as large as possible is effective for faster operation. Further, if the resolution of PWM is not taken into consideration, setting $V_{pwm}$ as large as possible is also effective. However, in reality, k and $V_{pwm}$ need to be appropriately set with these factors taken into account. $V_{pwm}$ is designed and determined based on necessary resolution and the clock frequency $f_{clock}$ of the driving device (the pulse generation circuit). The present inventors have found that k for $V_{pwm}$ can be appropriately derived from the break power $P_{break}$ of the heater and switch powers $P_{cross}$ and $P_{bar}$, which are easily measurable. Referring to the above-described pulse with a long pulse width as a turbo pulse, a process of deriving a turbo pulse is described below.

The repetition frequency of PWM is denoted by $f_{rep}$, which is set to a value sufficiently larger than a small-signal response frequency $f_{heater}$ of the heater. Then, the repetition interval $T_{rep}$ is $T_{rep}=1/f_{rep}$. The power $P_{switch}$ necessary to switch the MZ switch from the cross state to the bar state is:

$$P_{switch}=P_{bar}-P_{cross} \quad (2)$$

($P_{bar}$ and $P_{cross}$ are measured values). Then, the turbo pulse power $P_{TP}$ temporarily applied for speedup can be expressed as follows using the k (>1) defined in Formula (1):

$$P_{TP}=k \times P_{switch}=k \times (P_{bar}-P_{cross}). \quad (3)$$

(Power which is k times the switch power $P_{switch}$ is temporarily applied for speedup.)

There are constraints (a), (b) for the determination of k.
(a) Turbo pulse power $P_{TP}$ needs to be smaller than the heater's break power $P_{break}$:

$$P_{TP}<P_{break}. \quad (4)$$

From Formula (3), $$k<P_{break}/(P_{bar}-P_{cross}). \quad (5)$$

(b) The duration for applying the turbo pulse needs to be sufficiently smaller than the heater's response to small signals. (Speedup means nothing if a turbo pulse is applied for a duration longer than the heater's response time in regular control.) In PWM control with the voltage $V_{pwm}$, the power $P_{cross}$ and the power $P_{bar}$ for achieving the cross state and the bar state, respectively, are expressed as $$P_{cross}=V_{pwm}^2/R*(T_{cross}/T_{rep}), \text{ and} \quad (6)$$

$$P_{bar}=V_{pwm}^2/R*(T_{bar}/T_{rep}) \quad (7)$$

where R is a heater resistance, and $T_{cross}$ and $T_{bar}$ are the pulse widths for achieving the cross state and the bar state, respectively.

The duration for applying a turbo pulse is, based on Formula (3) that defines it, $k \times (T_{bar}-T_{cross})$. The following conditional expression, which defines that $k \times (T_{bar}-T_{cross})$ is sufficiently shorter than the heater response in regular control, needs to hold true:

$$k \times (T_{bar}-T_{cross}) \ll 1/f_{heater}. \quad (8)$$

Based on Formulae (6) and (7), $$k \ll 1/f_{heater} \times \{V_{pwm}^2/(R \times T_{rep} \times (P_{bar}-P_{cross}))\}. \quad (9)$$

In Formula (9), "$\ll$" generally means that the value on the left is required to be a fraction of the value on the right.

Figure 13:
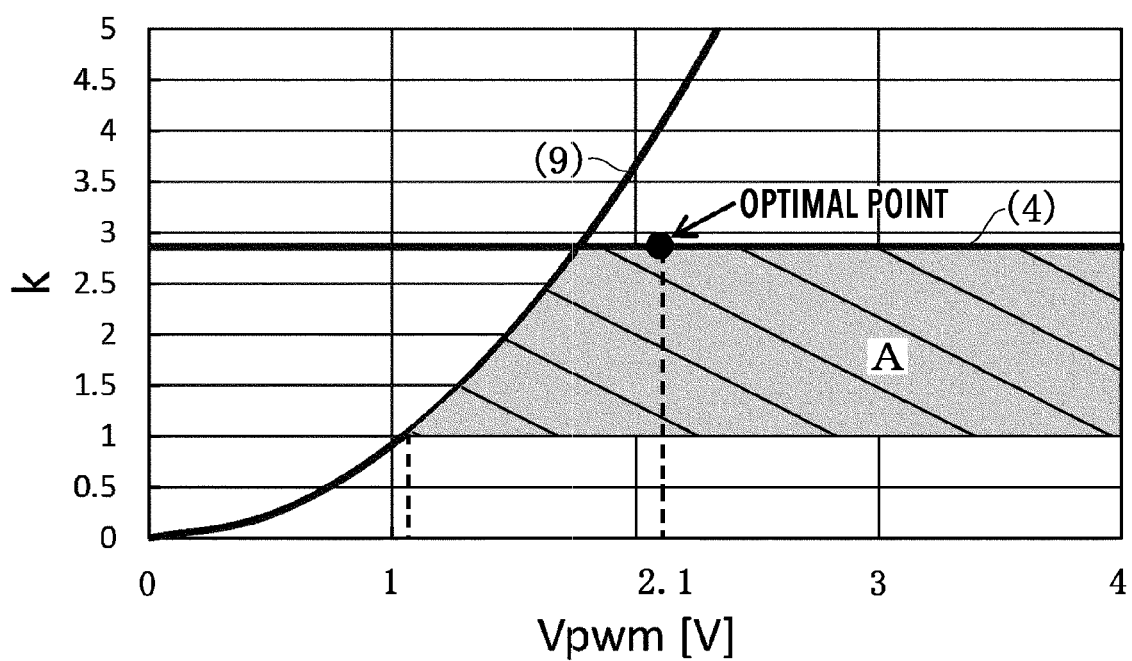
FIG. 13 is a diagram for obtaining a k value used for determining the pulse width of a voltage pulse being on constantly for a certain period of time according to an embodiment of the present invention.

When Formulae (5) and (9) are plotted under the following conditions (parameter values) with a silicon photonic heater made of TiN in mind, the relation between $V_{pwm}$ and k can be expressed as illustrated in FIG. 13. Note that "$\ll$" in Formula (9) is 1/5.

$f_{rep}$: 2 MHz
$T_{rep}$: 0.5 μs
$f_{heater}$: 50 kHz
$P_{break}$: 0.2 W
R: 250 ohm
$P_{bar}$: 0.035 W
$P_{cross}$: 0 W Since k>1 in FIG. 13, the hatched area A is a possible range of k with respect to the PWM voltage $V_{pwm}$. By setting k as large as possible, faster optical path switching can be expected.

On the other hand, the PWM voltage $V_{pwm}$ and the PWM resolution (the ability to change the pulse width in N levels) have the following relation:

$$P_{bar}/N=V_{pwm}^2/R*(\text{delta}T/T_{rep}) \quad (10)$$

where deltaT is the shortest pulse width. The relation between deltaT and the clock frequency $f_{clock}$ of the PWM control circuit is determined by the configuration of the driving device (the pulse generation circuit). $V_{pwm}$ can be obtained based on this relation and Formula (10). For example, $N$ is $2^n$ when a simple n-bit counter is used as the driving device (the pulse generation circuit), and since deltaT and the clock frequency $f_{clock}$ of the PWM control circuit have the relation of $f_{clock}=1/\text{delta}T$, $$V_{pwm}^2=f_{clock} \times P_{bar} \times R \times T_{rep}/2^n. \quad (11)$$

When the necessary resolution N is 1024 (n=10) and the clock frequency is 1 GHz, $V_{pwm}$=2.1 V can be derived based on Formula (11). Thus, under the above-described heater conditions (parameter values), the fastest response speed can be achieved when the black dot (optimal point) k=2.85 on $V_{pwm}$=2.1 illustrated in FIG. 13 is selected for the turbo pulse to drive the heater.

Figure 14:
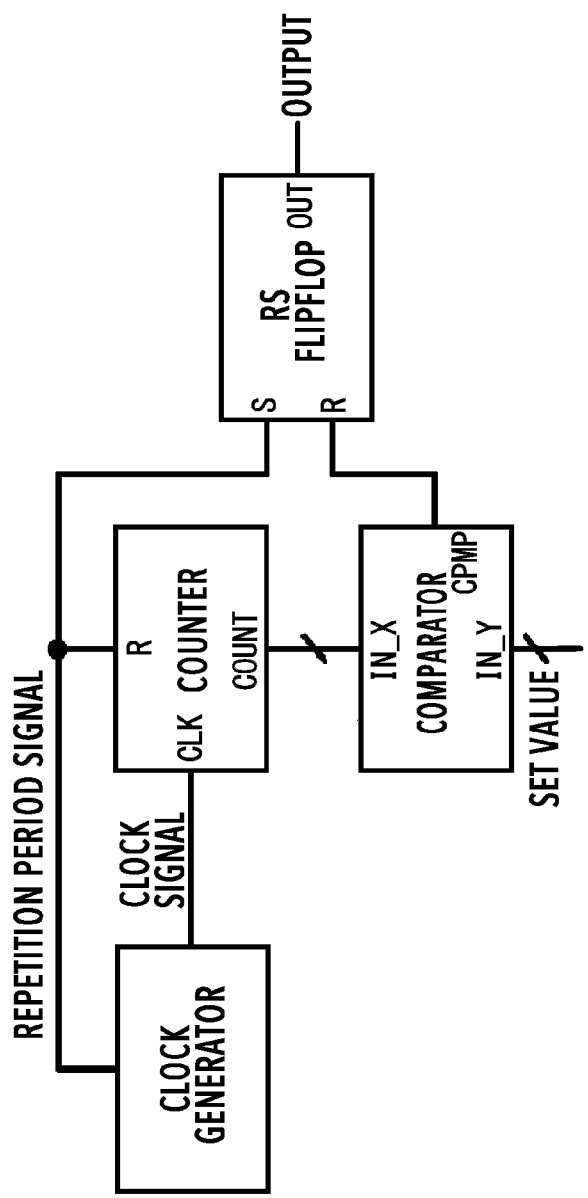
FIG. 14 is a diagram illustrating an example configuration of a pulse generation circuit according to an embodiment of the present invention.
Figure 15:
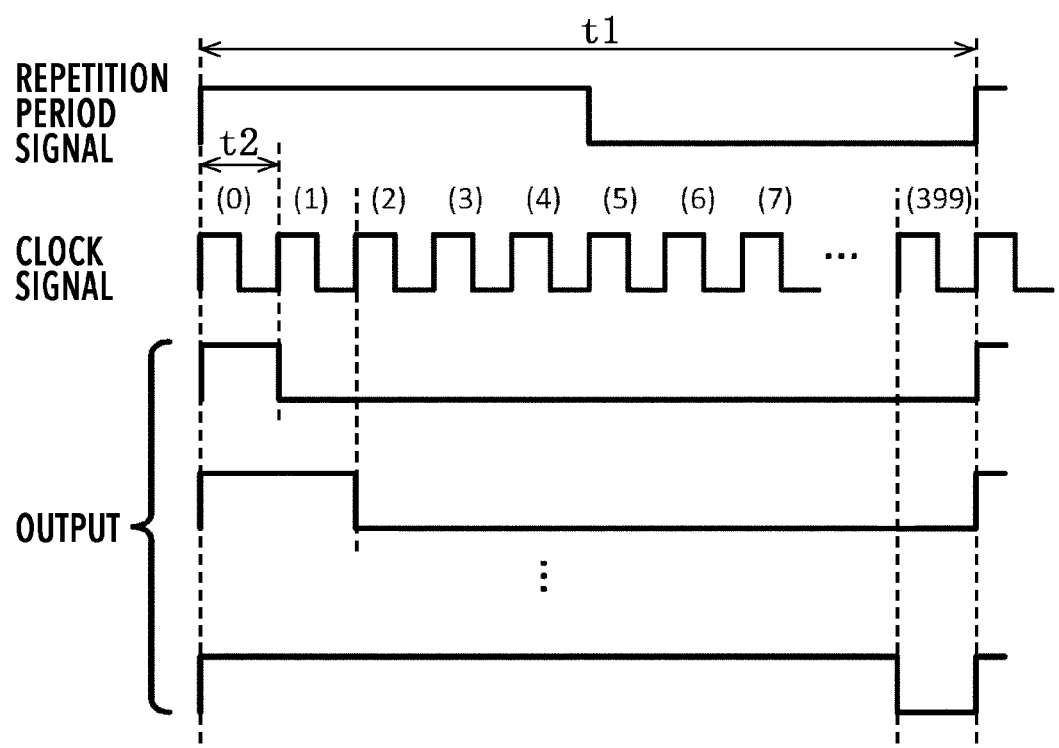
FIG. 15 is a diagram illustrating a time chart of voltage pulses generated by the pulse generation circuit according to the embodiment in FIG. 14.

The pulse generation circuit that generates the above-described voltage pulses may have any configuration. For example, a person skilled in the art can easily implement the pulse generation circuit using an FPGA (Field Programmable Gate Array). As an example, the block diagram in FIG. 14 illustrates a simple method for implementing the pulse generation for generating signals with predetermined pulse widths. FIG. 15 is a time chart corresponding to the configuration in FIG. 14. As mere examples, the experimentally-used repetition frequency and clock frequency are 1 MHz (t1=1 μs) and 400 MHz (t2=2.5 ns), respectively. Thus, the pulse width resolution is 1 us÷2.5 ns=400 levels. The counter used here is a scale-of-400 counter in which a counter outputs HIGH when a clock rises from zero, and a flipflop outputs LOW when a set value is inputted to a comparator.

When a versatile semiconductor integrated circuit like the one exemplified in FIG. 14 is assumed to be used, there is an upper limit to the clock frequency, so in order to maintain desired resolution, further reduction in the period t1 is restricted. Moreover, to enhance the effect of the above-described additional sequence, the logic voltage is increased in advance so that a desired temperature rise can be achieved in a steady state even if the regular high-temperature pulse width is reduced as much as possible. At the same time, a constantly-on signal applied for switching needs to be able to achieve a rapid temperature rise. Then, however, when a value close to zero is to be finely controlled to make the two waveguides have the same temperature, the resolution may be inconveniently not high enough to attain the optimal value.

Figure 16:
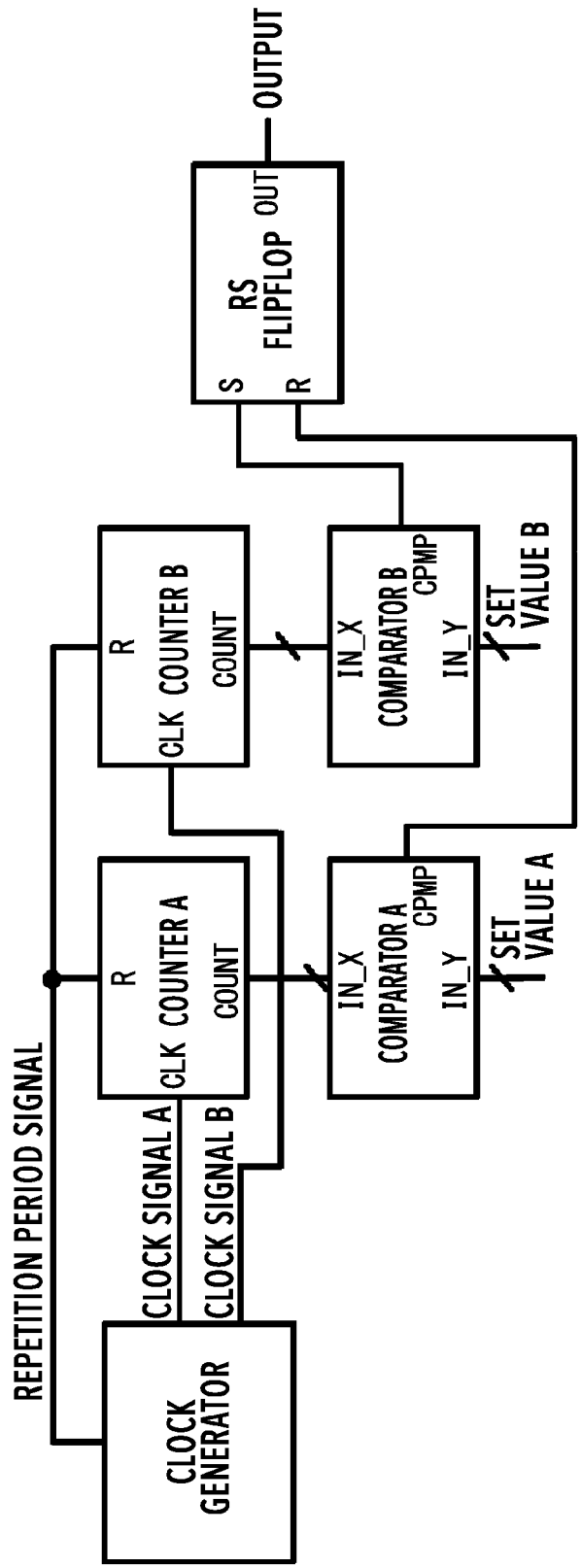
FIG. 16 is a diagram illustrating an example configuration of a pulse generation circuit according to an embodiment of the present invention.

Thus, proposed herein is a high-resolution pulse generation circuit like the one illustrated in FIG. 16 for example.

Figure 17:
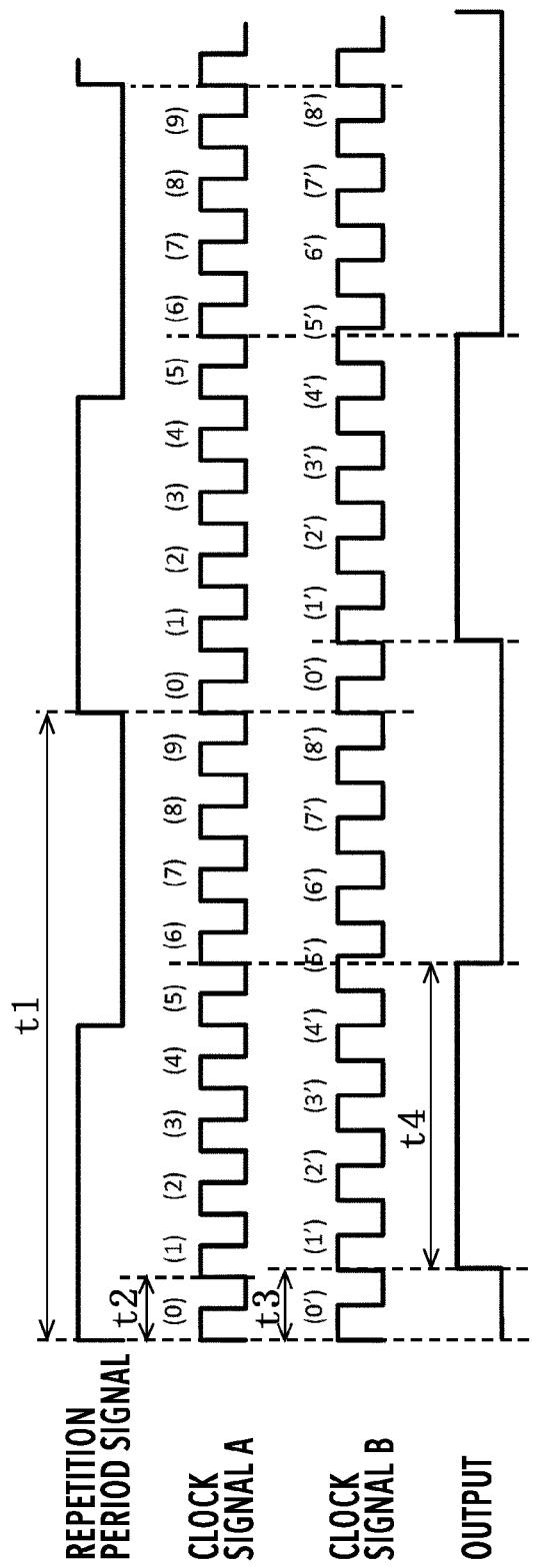
FIG. 17 is a diagram illustrating a time chart of voltage pulses generated by the pulse generation circuit according to the embodiment in FIG. 16.

FIG. 17 illustrates the corresponding time chart. In FIG. 17, a clock signal A and a clock signal B have slightly different cycles. The clock signal A has a frequency of 400 MHz (cycle of 2.500000 ns), the clock signal B has a frequency of 399 MHz (cycle of 2.506266 ns), and the repetition frequency is, like in FIG. 15, 1 MHz (t1=1 us). The output is set at a given rise of the clock signal B (i.e., when the comparator B detects that the counter B has reached a predetermined set value B), and the output is reset at a given rise of the clock signal A (i.e., when the comparator A detects that the counter A has reached a predetermined set value A). A desired output can be obtained when Set and Reset signals are inputted to an RS flipflop.

Using the Vernier effect, the output can be set with high resolution. A specific resolution in this case is (1 us÷2.500000 ns)×(1 us÷2.506266 ns)=400×399=159600 levels, which is a very high resolution. Actually, the above number is believed to be inaccurate due to jitter or the like caused by circuit noise, and therefore the numeral value needs to be selected appropriately.

Figure 18:
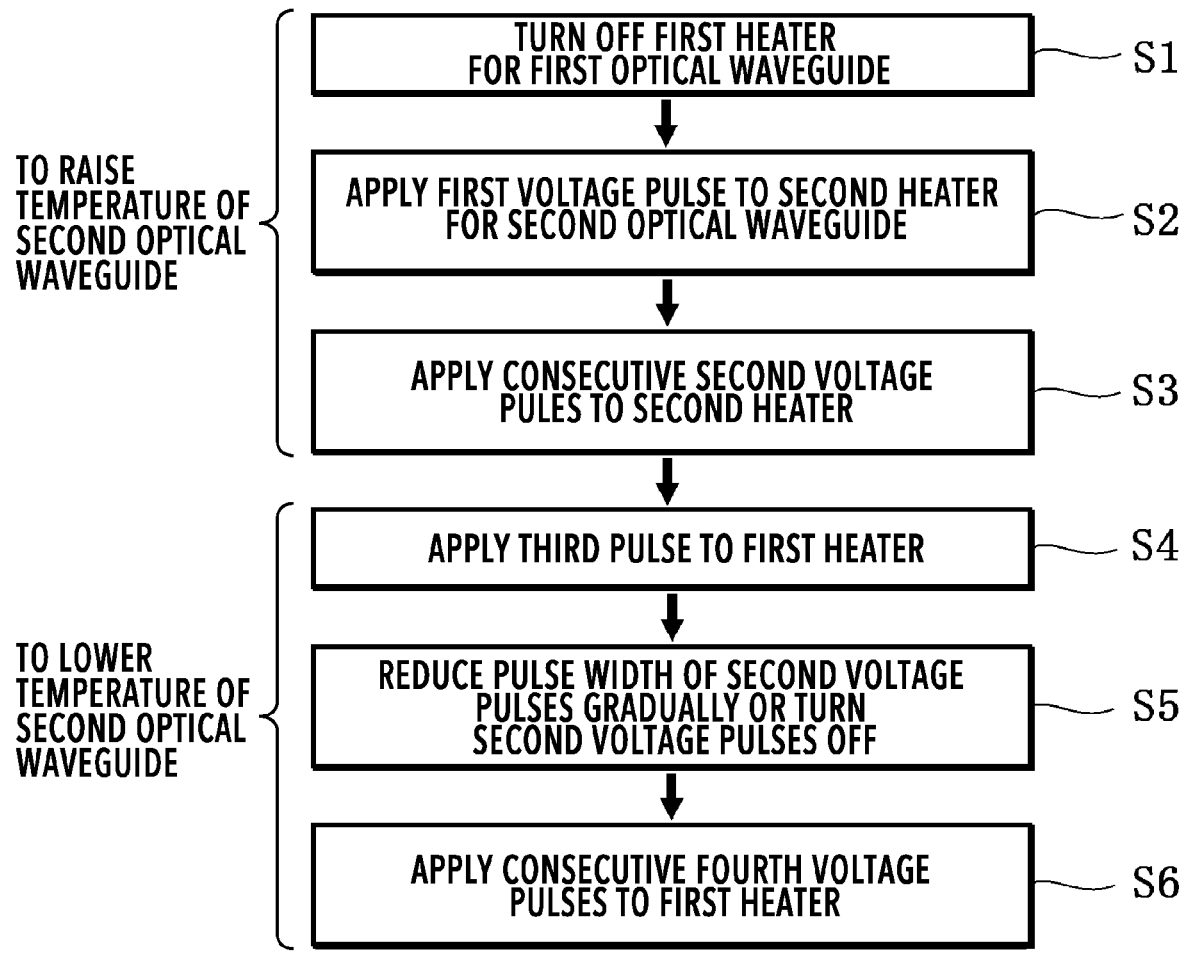
FIG. 18 is a diagram illustrating a flowchart of a driving method for a phase controller according to an embodiment of the present invention.

Finally, with reference to FIG. 18, a description is given of a method for driving a phase controller according to an embodiment of the present invention. Note that the flowchart in FIG. 18 is an aggregation of the example operations of the phase controller already described with main reference to FIGS. 8 to 11, as a comprehensive series of steps. As to more detailed operations, refer to the above-described operation examples illustrated in the drawings. FIG. 18 includes Steps S1 to S3 for raising the temperature of a second optical wave guide (the optical waveguide 2 in FIG. 8 and the like) and Steps S4 to S6 for lowering the temperature of the same. Note that the flowchart similarly applies to raising and lowering the temperature of a first optical waveguide (the optical waveguide 1 in FIG. 8 and the like) instead of the second optical waveguide, simply by replacing the term "second" with a term "first" in the steps.

In Step S1, the driving device turns off the first heater for the first optical waveguide. Specifically, as exemplified in FIG. 8 for example, the driving device turns the voltage pulses 26 being applied to the heater 1A for the optical waveguide 1 off (to zero) to bring the heater 1A to the state 27 in which no voltage pulse is applied. In Step S2, the driving device applies a first voltage pulse to the second heater for the second optical waveguide. Specifically, as exemplified in FIG. 8 for example, when starting optical path switching (when switching starts), the driving device applies to the heater 2A the voltage pulse 28 having a long pulse width and being on constantly for a certain period of time. The voltage pulse 28 is applied from the start of the temperature rise until the temperature of the optical waveguide 2 converges (period t3). In Step S3, the driving device applies a plurality of consecutive second voltage pulses to the second heater for the second optical waveguide. Specifically, as exemplified in FIG. 8 for example, the driving device applies the voltage pulses 29 following the voltage pulse 28 and having a short pulse width.

In Step S4, the driving device applies a third voltage pulse to the first heater for the first optical waveguide. Specifically, as exemplified in FIG. 9 for example, the driving device applies the voltage pulse 33 having a long pulse width and being on constantly for a certain period of time to the heater 1A at the start of optical path switching. In Step S5, the driving device reduces the pulse width of the second voltage pulses to the second heater gradually or turns the second voltage pulses off (to zero). Specifically, as exemplified in FIG. 9 for example, after a lapse of the period t4 since the start of switching, the driving device reduces the pulse width of the voltage pulses 35 to the heater 2A gradually and applies them as the voltage pulses 36. Then after a lapse of the period t5, the driving device reduces the voltage pulses 36 to the zero-pulse state.

Instead of the gradual reduction of the pulse widths of the second voltage pulses, the driving device may, as exemplified in FIG. 10, turn the voltage pulses 42 being applied to the heater 2A off (to zero) after a lapse of the period t6 from the start of optical path switching. Still alternatively, as exemplified in FIG. 11, the driving device may turn the voltage pulses 49 being applied to the heater 2A off (to zero) at the start of optical path switching. In Step S6, the driving device applies a plurality of fourth voltage pulses to the first heater. Specifically, as exemplified in FIG. 9, 10, or 11 for example, the driving device applies to the heater 1A a plurality of voltage pulses 34, 41, or 48 following the voltage pulse 33, 40, or 47, respectively, and having short pulse widths.

Pulse operations have been described above taking an optical switch as an example, but the approach of the present invention is applicable to an optical element that controls the propagation speed or phase of light thermo-optically by controlling the temperature of an optical waveguide using a heater, the optical element being designed to change the temperature by controlling the pulse widths (duty cycles) of electric signals applied to the heater. The present invention is easily applicable to, for example, an optical filter or optical attenuator using an MZI. Such optical elements can not only set the optical phases of the two optical waveguides to the same phase or opposite phases using optical couplers (OC) like an optical switch, but also set the optical phases of the two optical waveguides to predetermined phases in between. Also in such a case, the above-described method of the present invention can speed up temperature change in an operation of switching from a given intermediate value to another intermediate value.

The embodiments of the present invention have been described with reference to the drawings. However, the present invention is not limited to these embodiments. The present invention can be implemented in modes further improved, corrected, or modified variously based on the knowledge of those skilled in the art without departing from the gist of the present invention.

INDUSTRIAL APPLICABILITY

The present invention can be used as an optical switch, an optical filter, or an optical attenuator for use in a node of optical communications (network), or as part of an optical circuit or an optical integrated circuit.

REFERENCE SIGNS LIST 1, 2, 11: optical waveguide
3, 4: optical coupler (OC)
5, 6, 14: phase controller (heater)
7, 8: driving device for phase controller
12: cladding layer
13: groove
100: optical switch

The invention claimed is:
1. An optical device comprising:
two input ports;
two output ports;
first and second optical couplers arranged in series between the input ports and the output ports;

first and second optical waveguides extending in parallel while connecting the first and second optical couplers to each other;

a first phase controller provided on the first optical waveguide between the first optical coupler and the second optical coupler and for controlling a temperature of the first optical waveguide using a first heater to control a phase of light propagating therethrough;

a second phase controller provided on the second optical waveguide between the first optical coupler and the second optical coupler and for controlling a temperature of the second optical waveguide using a second heater to control a phase of light propagating therethrough; and a pulse generation circuit for applying pulse-width modulated voltage pulses with predefined average power to the first and second heaters to control a phase difference between the first and second waveguides, wherein, when switching from a cross state to a bar state or from the bar state to the cross state by raising the temperature of the second heater, the pulse generation circuit is configured to:

apply a voltage pulse being on constantly for a certain period of time to the first heater, and thereafter, apply a plurality of consecutive voltage pulses having a first pulse-width to the first heater and a plurality of consecutive voltage pulses having a third pulse-width to the second heater instead of a plurality of consecutive voltage pulses having a second pulse-width, and gradually shorten the first pulse width and the third pulse width.

2. An optical device comprising:

two input ports;

two output ports;

first and second optical couplers arranged in series between the input ports and the output ports;

first and second optical waveguides extending in parallel while connecting the first and second optical couplers to each other;

a first phase controller provided on the first optical waveguide between the first optical coupler and the second optical coupler and for controlling a temperature of the first optical waveguide using a first heater to control a phase of light propagating therethrough;

a second phase controller provided on the second optical waveguide between the first optical coupler and the second optical coupler and for controlling a temperature of the second optical waveguide using a second heater to control a phase of light propagating therethrough; and a pulse generation circuit for applying pulse-width modulated voltage pulses with predefined average power to the first and second heaters to control a phase difference between the first and second waveguides, wherein, when switching from a cross state to a bar state or from the bar state to the cross state by raising the temperature of the second heater, the pulse generation circuit is configured to:

apply a voltage pulse being on constantly for a certain period of time to the first heater, and thereafter, apply a plurality of consecutive voltage pulses having a first pulse-width to the first heater and a zero-pulse state to the second heater instead of a plurality of consecutive voltage pulses having a second pulse-width.

3. An optical device comprising:

two input ports;

two output ports;

first and second optical couplers arranged in series between the input ports and the output ports;

first and second optical waveguides extending in parallel while connecting the first and second optical couplers to each other;

a first phase controller provided on the first optical waveguide between the first optical coupler and the second optical coupler and for controlling a temperature of the first optical waveguide using a first heater to control a phase of light propagating therethrough;

a second phase controller provided on the second optical waveguide between the first optical coupler and the second optical coupler and for controlling a temperature of the second optical waveguide using a second heater to control a phase of light propagating therethrough; and a pulse generation circuit for applying pulse-width modulated voltage pulses with predefined average power to the first and second heaters to control a phase difference between the first and second waveguides, wherein, when switching from a cross state to a bar state or from the bar state to the cross state by raising the temperature of the second heater, the pulse generation circuit is configured to:

apply a voltage pulse being on constantly for a certain period of time to the first heater and a zero-pulse state to the second heater instead of a plurality of consecutive voltage pulses having a second pulse-width, and thereafter, apply a plurality of consecutive voltage pulses having a first pulse-width to the first heater.

* * * * *